(12) United States Patent  
Bouhaj

(10) Patent No.: US 7,987,872 B2
(45) Date of Patent: Aug. 2, 2011

(54) DIAPHRAGM FOR THROTTLING A VOLUME FLOW IN AN AIR DISTRIBUTION DUCTING SYSTEM OF AN AIR-CONDITIONING UNIT OF A COMMERCIAL AIRCRAFT

(75) Inventor: Mohamed Bouhaj, Hamburg (DE)

(73) Assignee: Airbus Deutschland GmbH, Hamburg (DE)

( * ) Notice: Subject to any disclaimer, the term of this patent is extended or adjusted under 35 U.S.C. 154(b) by 374 days.

(21) Appl. No.: 11/829,693

(22) Filed: Jul. 27, 2007

(65) Prior Publication Data

US 2008/0035208 A1    Feb. 14, 2008

(30) Foreign Application Priority Data

Aug. 10, 2006   (DE) .......................... 10 2006 037 537

(51) Int. Cl.
*F15D 1/02*      (2006.01)
(52) U.S. Cl. ........................................... 138/45; 138/46
(58) Field of Classification Search ..................... 138/45, 138/46
See application file for complete search history.

(56) References Cited

U.S. PATENT DOCUMENTS

| | | | |
|---|---|---|---|
| 1,578,668 A * | 3/1926 | Kirkpatrick ................. | 48/189.6 |
| 2,001,970 A * | 5/1935 | Mazer ........................... | 181/288 |
| 3,563,213 A * | 2/1971 | Hambric ....................... | 123/203 |
| 3,750,710 A * | 8/1973 | Hayner .......................... | 138/40 |
| 3,954,031 A * | 5/1976 | Tull et al. ...................... | 82/163 |
| 4,211,305 A * | 7/1980 | Matthews et al. ............ | 181/248 |
| 4,377,968 A * | 3/1983 | Gerry ............................ | 454/213 |
| 4,592,390 A * | 6/1986 | Boyd ............................. | 138/45 |
| 4,989,456 A * | 2/1991 | Stupecky ................... | 73/863.53 |
| 2003/0075870 A1* | 4/2003 | Meuter ........................ | 277/355 |
| 2003/0106214 A1* | 6/2003 | Mortzheim et al. ......... | 29/889.1 |
| 2007/0215227 A1* | 9/2007 | Gosis et al. .................. | 138/119 |

FOREIGN PATENT DOCUMENTS

DE          27 03 865        8/1977

* cited by examiner

*Primary Examiner* — James F Hook
(74) *Attorney, Agent, or Firm* — Wood, Herron & Evans, LLP

(57) ABSTRACT

The invention relates to a diaphragm (1) for throttling a volume flow in an air distribution ducting system of an air-conditioning unit of a commercial aircraft. The diaphragm includes a plurality of spring-elastic elements (10) that effect a throttling of the volume flow through the diaphragm (1). The invention also relates to the use of such a diaphragm (1) for installation in an air distribution ducting system of an air-conditioning unit on board a commercial aircraft.

20 Claims, 4 Drawing Sheets

DIAPHRAGM FOR THROTTLING A VOLUME FLOW IN AN AIR DISTRIBUTION DUCTING SYSTEM OF AN AIR-CONDITIONING UNIT OF A COMMERCIAL AIRCRAFT

FIELD OF INVENTION

The present invention relates to a diaphragm for throttling a volume flow in an air distribution ducting system of an air-conditioning unit of a commercial aircraft.

BACKGROUND OF THE INVENTION

Passenger comfort in the cabin space of a commercial aircraft depends to a considerable extent on the prevailing noise level in the cabin space, which is generated by various sound sources on board the commercial aircraft. Thus, the air-conditioning system, which comprises various components of an air distribution ducting system as well as fan devices, creates a noise level that is clearly detectable by the passengers.

The noise generated by the air-conditioning unit is of a flow-acoustic type. Any measure used to absorb or reduce the produced resultant sound involves extra effort and expenditure, since the necessary components for this purpose, such as for example sound absorbers, contribute to the weight and the overall costs of a commercial aircraft. The aim of all attempts to reduce the cabin noise is primarily to control the noise, i.e. eliminate or at least mitigate the flow-acoustic sources in the air conditioning system.

In the air distribution ducting system of the air-conditioning unit diaphragms are used that regulate and throttle the amount of air and the volume flow through the air distribution ducting system. Conventional diaphragms have for example the shape of a metal ring with an external diameter adapted to the internal diameter of the air-conditioning duct, as well as an axially centrally arranged passage that has a smaller diameter compared to the external diameter of the diaphragm. Another conventional diaphragm is designed for example as a multi-aperture diaphragm.

If the volume flow in a pipe encounters an obstacle, such as for example a diaphragm, the fluid particles become detached from the inner wall of the pipe and an eddying of the wake flow occurs downstream of the diaphragm. So-called turbulence bundles, which act on the pipe wall, are formed by the change in the flow conditions after the diaphragm and by the pressure rise generated in the wake downstream of the diaphragm. At the same time, under certain flow conditions, the diaphragm itself can be excited to perform vibrations. Thus, the sound is produced primarily by dipolar sources, i.e. by excitation of the diaphragm itself and by interaction of the turbulence bundles with the pipe wall of the air distribution ducting system. The generated sound propagates through the air-conditioning system and thus reaches the aircraft cabin.

A diaphragm of predetermined geometry can generate only a certain pressure loss, which is dependent on the other flow conditions. In order to supply different amounts of air to the different regions of the air distribution ducting system, such as for example the temperature zones in the cabin, the freight compartment, the avionics, etc., various types of diaphragm are accordingly employed, which depending on their size and shape generate different pressure losses, whereby the volume flow in these regions can be adjusted as desired.

The connection between the pressure loss generated by the diaphragm and the volume flow through the diaphragm can be determined by means of the following equation:

$$\Delta p = \varsigma \cdot \frac{\rho}{2} \cdot U^2 \quad (1)$$

where $\rho$ is the density of the flowing medium, U is the volume flow and $\varsigma$ depends on the geometry of the diaphragm and, in the case of an annular diaphragm, is defined as follows:

$$\varsigma = \left(\frac{A_1}{\alpha \cdot A_2} - 1\right)^2 \quad (2)$$

In this connection $A_1$ is equal to the pipe cross-section upstream of the diaphragm, $A_2$ is equal to the pipe cross-section downstream of the diaphragm and $\alpha$ is equal to a constant, which in the case of sharp (acute) diaphragm edges is equal to 0.63.

The continuity equation determines the dependence between the volume flow dV/dt and the flow velocity U. The following relationship exists:

$$\frac{dV}{dt} = U \cdot A \quad (3)$$

where for a circular pipe of diameter d the cross-sectional surface amounts to $$A = \pi \cdot d^2 / 4 |$$

In order to keep the sound level in the aircraft cabin as low as possible, a diaphragm installed in the air distribution ducting system should in the ideal case perform two types of functions. Firstly, it should generate a pressure loss at the installation site in the air-conditioning duct. Secondly, the sound level generated by it should be as low as possible.

Although the pressure loss generated by the diaphragm is not desirable from the acoustic aspect, nevertheless from the flow technology aspect, it is necessary in order to be able to adjust the volume flow and thus the throughput of the volume flow through the air distribution ducting system.

An object of the present invention is accordingly to provide a diaphragm for throttling a volume flow in an air distribution ducting system of an air-conditioning unit of a commercial aircraft, which on the one hand generates a desired pressure loss, but on the other hand generates a low sound level, in order to thereby configure the air-conditioning system of the aircraft so that it generates little noise.

SUMMARY OF THE INVENTION

According to the invention this object is achieved by a diaphragm for throttling a volume flow in an air distribution ducting system of a commercial aircraft, which comprises a plurality of spring-elastic elements which produces a throttling of the volume flow through the diaphragm.

Due to the spring-elasticity of the elements producing the throttling of the volume flow, the air stream flowing through the diaphragm is prevented from causing the diaphragm itself to execute vibrations that could propagate through the air distribution ducting system into the cabin space. The kinetic energy of the air particles in the pipe is thus not converted into vibrational energy of the diaphragm, but is instead absorbed by the latter, mainly due to reversible deformation of the spring-elastic elements. On the one hand, the spring-elastic elements should suppress or at least attenuate the formation of a turbulent flow in the wake of the diaphragm, and should avoid exciting the diaphragm to execute vibrations due to the air flow. On the other hand, the diaphragm should generate the desired pressure loss at the installation site of the diaphragm. In other words, the totality of the spring-elastic elements must form an obstacle to the air flow in order to generate the desired pressure loss, while at the same time permeable regions must be present that suppress or at least attenuate the formation of turbulence bundles downstream of the diaphragm, since the kinetic energy of the air flow downstream of the diaphragm is increased compared to a conventional diaphragm.

According to a preferred modification of the invention, the plurality of spring-elastic elements defines a plurality of longitudinally shaped openings. The air stream in the air distribution ducting system can pass through the openings defined by the spring-elastic elements, whereby the formation of turbulences in the wake of the diaphragm is significantly reduced since the flow profile of the air flow downstream of the diaphragm does not exhibit such pronounced velocity gradients compared to a conventional diaphragm. The sound level generated by the diaphragm is thus reduced to a significant degree by these openings.

According to a further preferred embodiment of the invention, the plurality of spring-elastic elements are formed separately from one another, and are preferably arranged uniformly spaced apart from one another along the circumference of the diaphragm. The fabrication of such a diaphragm is thereby simplified. Similarly, the geometry of the diaphragm, which has an influence on the pressure loss and thus on the generated sound level, can be chosen as desired depending on the shape and length of the individual spring-elastic elements.

Preferably the diaphragm is cylindrically shaped, in which case it is suitable in particular for cylindrical ducting systems of the air-conditioning unit on board a commercial aircraft.

Furthermore, in the case of a cylindrically shaped diaphragm, the plurality of spring-elastic elements comprise radially internal ends which define a circular opening that is preferably arranged on the axis of the diaphragm.

This axially centrally arranged circular opening permits the main throughput of the volume flow through the diaphragm, with the result that the volume flow has the largest flow velocity in this region and decreases significantly outwardly in the radial direction. However, due to the openings between the spring-elastic elements extending outwardly in the radial direction, the flow velocity of the air stream in this region is less strongly reduced than would be the case without these openings.

Accordingly, the air stream in this region has a higher kinetic energy compared to a diaphragm that has no openings in this region, which in turn means that the air flow in the wake of the diaphragm exhibits less strongly pronounced turbulence bundles. The sound level generated by the diaphragm is thereby reduced still more.

According to a preferred embodiment of the invention, each spring-elastic element (in the case of a cylindrical diaphragm) comprises radially inner and outer ends, which have different widths in the axial direction, i.e. in the flow direction. Preferably the width of the radially inner end of each spring-elastic element is larger than the width of the radially outer end.

By suitably choosing the geometry of the spring-elastic elements the flow conditions downstream of the diaphragm can be specifically influenced. Since the geometry of the diaphragm has an influence on the pressure loss generated by the diaphragm and thus on the sound level generated by it, the acoustic properties of the diaphragm can thereby be specifically altered. In particular the axial width of the radially inner end of each spring-elastic element has an influence on the pressure loss generated by the diaphragm and thus on the sound level of the diaphragm.

The plurality of spring-elastic elements are preferably framed in an outer plastics ring, which simplifies the mass production of such diaphragms as well as the installation of the diaphragm in an air distribution ducting system, largely fabricated from plastics piping (glass fibre reinforced plastics), on board a commercial aircraft.

According to a preferred embodiment each spring-elastic element has a tapering section. Openings between adjacent spring-elements are defined by this tapering section, which reduce the formation of turbulence bundles in the wake of the diaphragm and thus have an influence on the flow-acoustic sound properties of the diaphragm.

Preferably each spring-elastic element has the shape of a bristle. Accordingly, the diaphragm resembles a brush configured to form a closed ring, in which the individual bristles form a type of "flow curtain" with respect to the volume flow. The "flow curtain" on the one hand generates the desired pressure loss, and on the other hand attenuates the sound level generated by the diaphragm, since the turbulent flow occurring downstream of the diaphragm is less strongly pronounced.

According to a preferred embodiment the plurality of spring-elastic spring elements are made of a plastics material, whereby the manufacturing costs and the weight of such diaphragms are reduced.

According to a second aspect the invention relates to the use of a diaphragm described hereinbefore for installation in an air distribution ducting system of an air-conditioning unit on board a commercial aircraft.

The invention is described in more detail hereinafter with reference to the accompanying diagrammatic drawings.

DETAILED DESCRIPTION OF A PREFERRED EMBODIMENT OF THE INVENTION

Figure 1A:
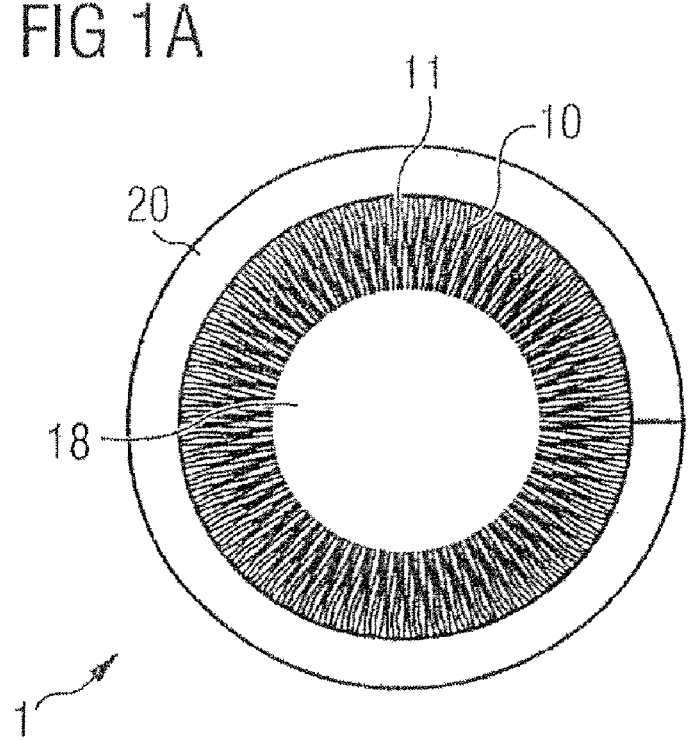
FIG. 1A shows a radial cross-section of a brush-type diaphragm according to the invention.

A preferred embodiment of the invention is described hereinafter with reference to FIG. 1A and FIG. 1B. FIG. 1A is a radial cross-sectional view of a diaphragm 1 according to a preferred embodiment of the invention, while FIG. 1B is an axial cross-sectional view of two diametrically opposite spring-elastic elements or bristles 10.

FIG. 1A shows a diaphragm 1, which comprises a plurality of spring-elastically configured bristles 10, the radial outer ends 14 of which are framed in a closed ring 20 made of plastics material. The bristles are formed separately from one another. Adjacent bristles define openings 11 which run from the radially inner end 12 of the bristles 10 in the radial direction as far as the ring 20. The radially inner ends 12 of the bristles 10 define a circular opening 18 arranged coaxially to the ring 20.

Although it is not evident from FIG. 1A, a second ring arranged coaxially to the illustrated ring 20 may be present, in order to bring the radially outer ends 14 of the bristles 10 into gripping engagement between the rings. Various types of securement of the bristles 10 to the ring 20 or between two rings may be considered, such as for example interlocking-type and/or frictional-type securements (tongue and groove joints, bolt/screw connections, etc.), bonded connections.

Figure 1B:
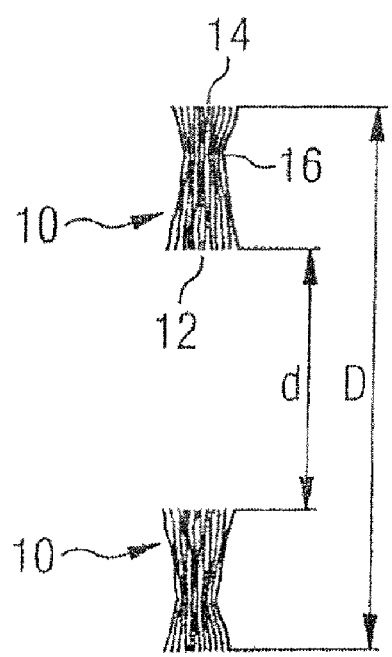
FIG. 1B shows an axial cross-section of two diametrically opposite groups of bristles of the brush diaphragm illustrated in FIG. 1A.

As can be seen from FIG. 1B, the bristles 10 have an "hour glass" shape in the axial cross-section. The radially inner end 12 of the bristles 10 has a width which in the preferred embodiment is greater than the width of the radially outer end 14. The bristles 10 include a tapering region 16. Openings 11 are formed between adjacent bristles 10 by these tapering regions 16, which in addition to the circular opening 18 allow a passage of the volume flow through the diaphragm 1. Likewise it is possible for the interspacing between the radially outer end 14 and the tapering region 16 to correspond substantially to the radial width of the ring 20.

The person skilled in the art understands, however, that the invention is not restricted to the geometry of the bristles illustrated in FIG. 1B. Thus, the bristles 10 may also have convexly or concavely shaped surfaces or may be of a cylindrical shape.

The bristles are preferably made of a plastics material, for example as synthetic hair bristles or as natural hair bristles.

The parameters that have an influence on the pressure loss generated by the diaphragm 1 and thus on the sound intensity are basically the diameter d of the circular opening 18, the axial width of the radially inner ends 12 of the bristles 10, as well as the material and the stiffness of the bristles 10. By a suitable choice of these parameters a diaphragm can be obtained that generates the desired pressure loss and produces as low a sound intensity level as possible.

Figure 2:
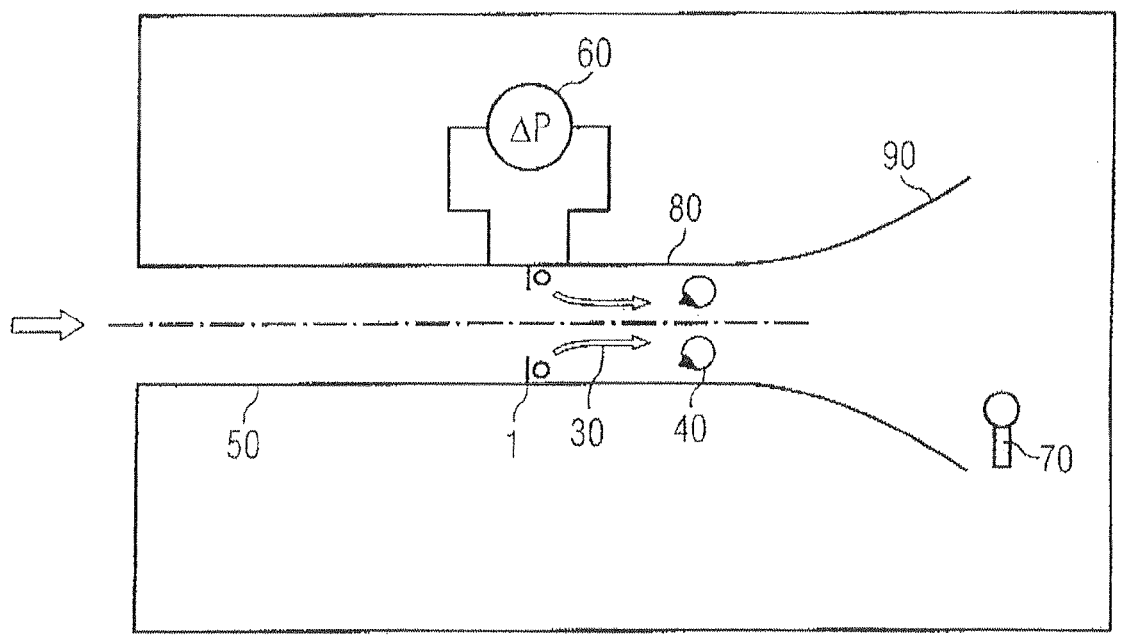
FIG. 2 shows diagrammatically a measurement arrangement for measuring the sound intensity of the brush-type diaphragm illustrated in FIG. 1A in an echo chamber.

A measurement arrangement for measuring the sound intensity of the bristle diaphragm 1 in an echo chamber is shown in FIG. 2. The circular opening 18 of the bristle diaphragm 1 used in the measurement had a diameter of d=15 mm and the axial width of the radially inner ends 12 of the bristles 10 was 16 mm. The interspacing D of the radially outer ends 14 of two diametrically opposite groups of bristles of the diaphragm 1 was 100 mm in the measurement example and corresponded to the internal diameter of the pipe 50. In other words, only the bristles 10 were subjected to the volume flow through the pipe 50. The pressure loss generated by the diaphragm 1 was measured with a digital manometer 60.

Air was fed in a gentle stream into the pipe 50 shown in FIG. 2. The air flow through the pipe 50 was from left to right. In the wake section 80 located downstream of the diaphragm 1, the length of the section being approximately 0.5 m in the measurement example, a turbulent flow 30 was produced, which gave rise to turbulence bundles 40 at the downstream end of the wake section 80. The sound pressure generated by the diaphragm 1 was measured at the outlet of a funnel 90 by means of a rotating microphone boom 70, so that the measurement results could be collected over time and space.

The sound intensity generated in the echo chamber by the diaphragm 1 was measured by the comparison method according to ISO 3741 and ISO 3745. For this comparison method a standard sound source is required, the sound intensity level of which is known. The sound pressure level which this standard sound source generates in the echo chamber is measured and, together with the data of the standard sound source, provides a relationship between the sound intensity level emitted by the standard sound source and the sound pressure level generated thereby in the echo chamber, which is also valid for other sound sources in this echo chamber. The sound pressure level of the diaphragm 1 was measured in the measurement experiment.

The sound intensity level of the diaphragm 1 tested in the echo chamber was obtained from the following equation:

$$L_W = L_{Wr} + (L_P - L_{pr}) \qquad (4)$$

where
$L_W$=sound intensity level [dB(A)] of the tested diaphragm
$L_{Wr}$=sound intensity level [dB/(A)] of the standard sound source
$L_p$=sound pressure level [dB/(A)] of the tested diaphragm
$L_{pr}$=sound pressure level [dB/(A)] of the standard sound source All sound intensity levels and sound pressure levels are in the third octave band. The sound intensity levels as well as the sound pressure levels are given in [dB/(A)], where the letter A refers to the frequency range that can be detected by the human ear.

Figure 3:
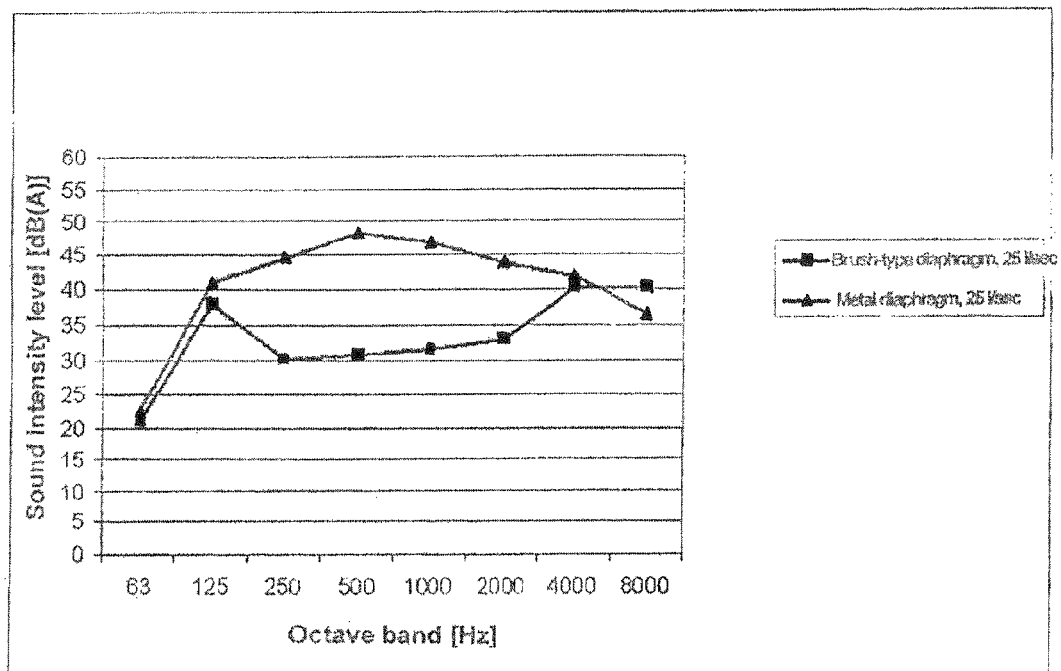
FIG. 3 shows an experimental comparison of the sound intensity level of the brush-type diaphragm according to the invention with a conventional metal diaphragm at a constant volume flow of 25 l/sec.
Figure 4:
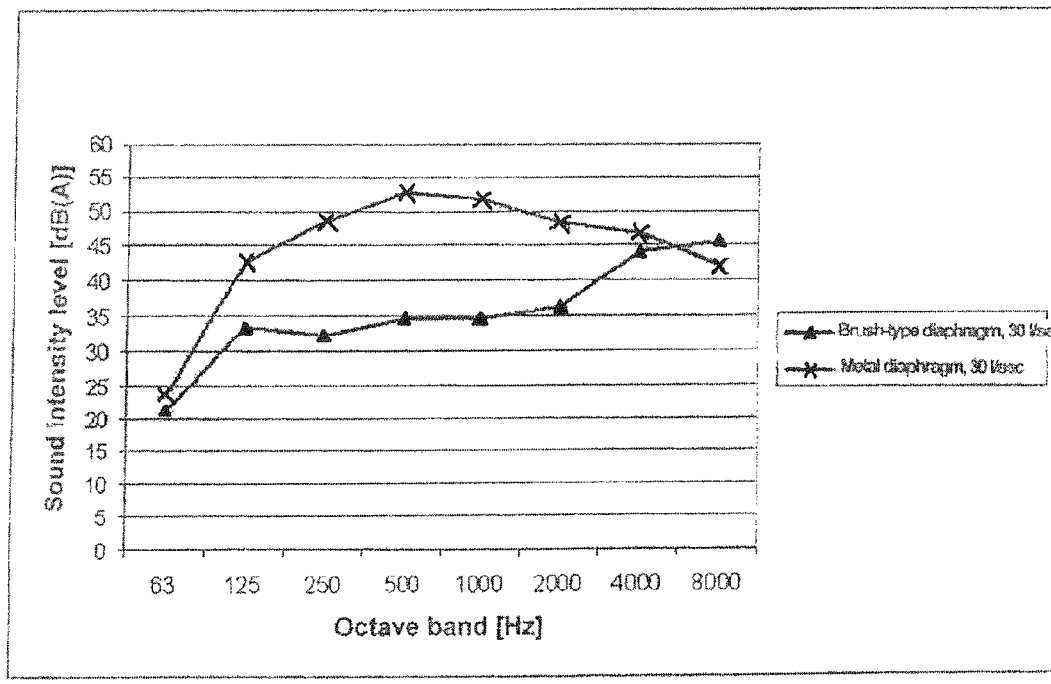
FIG. 4 shows an experimental comparison of the sound intensity level of the brush-type diaphragm according to the invention with a conventional metal diaphragm at a constant volume flow of 30 l/sec.

FIG. 3 shows a comparison of the sound intensity levels of the diaphragm 1 that can be detected by the human ear, as well as the sound intensity levels of the annular metal diaphragm known from the prior art, at two volume flows of 25 l/sec and 30 l/sec. As can be seen from FIG. 3, the sound intensity level of the brush-type diaphragm 1 at a frequency of 500 Hz compared to the conventional metal diaphragm is reduced by 18 dB. As can be seen from FIG. 4, the reduction of the sound intensity level with a volume flow of 30 l/sec was about 17 dB.

The pressure losses measured by the digital manometer 60 in the measurement experiment were as follows:

| Volume Flow [l/sec] | Δp Brush [Pa] | Δp Metal [Pa] |
| --- | --- | --- |
| 25 | 680 | 799 |
| 30 | 903 | 1112 |

Since the pressure loss generated by the brush-type diaphragm 1 is less compared to that generated by the metal diaphragm, the measured sound intensity levels of the brush-type diaphragm must be multiplied by a correction factor K.

If one considers the case of the same volume flow through two diaphragms and measures a pressure loss $\Delta p_1$ for the first diaphragm and a pressure loss $\Delta p_2$ for the second diaphragm, then the sound intensity levels of the first diaphragm have to be corrected by the correction factor $K_1$ in order to be able to compare the sound intensity levels of both diaphragms at a constant volume flow and constant pressure loss. The correction factor is in this case determined as follows:

$$K = 30 \cdot \log \frac{\Delta p_1}{\Delta p_2} \qquad (5)$$

Thus, the volume flow $$\frac{dV_1}{dt} = 25.0 l/s$$

produces the characteristic point $K_1$=2.21, and the volume flow $$\frac{dV_2}{dt} = 30.0 l/s$$

produces the characteristic point $K_2$=2.71.

Figure 5:
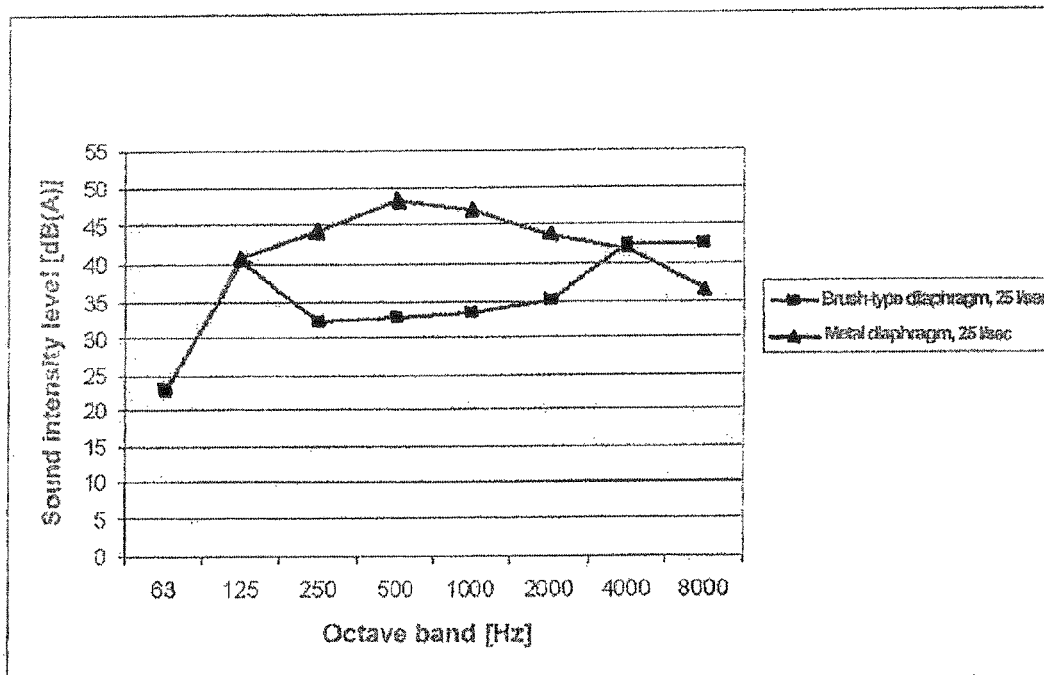
FIG. 5 shows a corrected comparison of the sound intensity level measured in FIG. 3.
Figure 6:
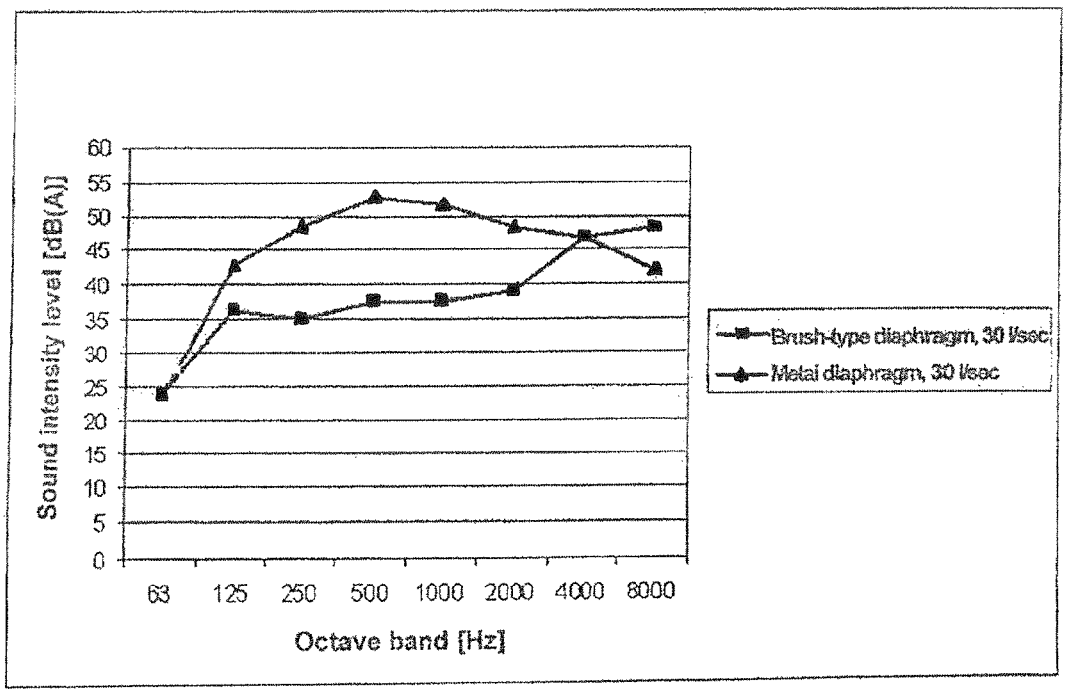
FIG. 6 shows a corrected comparison of the sound intensity level measured in FIG. 4.

FIGS. 5 and 6 show the sound intensity levels illustrated in FIGS. 3 and 5 and corrected in each case by the correction factor $K_1$ and $K_2$, for the brush-type diaphragm 1. In the frequency range from 125 Hz up to about 4000 Hz the sound intensity level of the brush-type diaphragm 1 is significantly reduced compared to the conventional metal diaphragm.

From FIG. 5 it is seen that there is a reduction of the sound intensity level of the brush-type diaphragm 1 of approximately 16 dB compared to the conventional metal diaphragm at a volume flow of 25 l/sec and at a frequency of 500 Hz. From FIG. 6 it can be seen that the sound intensity level of the brush-type diaphragm 1 at a volume flow of 30 l/sec and at a frequency of 500 Hz is approximately 14 dB lower compared to the conventional metal diaphragm.

The acoustic measurements that were carried out show a significant sound reduction if a brush-type diaphragm according to the invention is used instead of a conventional metal diaphragm. The brush-type diaphragm produces a pressure loss comparable to that of the conventional metal diaphragm. In the mid frequency range the sound intensity level of the brush-type diaphragm was on average reduced by a maximum of 15 dB.

A further advantage is the weight saving due to the use of the bristles made of plastics material, in particular having regard to the large number of diaphragms that are used in an air distribution ducting system of an air-conditioning unit on board a commercial aircraft.

The person skilled in the art recognises that the brush-type diaphragm according to the invention can be used not only to reduce noise when designing the air distribution ducting system of the air-conditioning unit on board a commercial aircraft, but is also suitable for installation in air-conditioning systems of trains, passenger ships and the like.

The invention claimed is:

1. Diaphragm for throttling a volume flow in an air distribution ducting system of an air-conditioning unit of a commercial aircraft, comprising:
a plurality of spring-elastic elements effecting the throttling of the volume flow through the diaphragm, the plurality of spring-elastic elements framed in an outer ring and having inner ends that define a central opening and an axial width in the direction of the volume flow, the width being selected depending on the throttling and a reduction of noise to be obtained, the plurality of spring-elastic elements defining a permeable region that includes openings residing between the spring-elastic elements that extend radially outwardly, the permeable region attenuating a formation of turbulence bundles, wherein the plurality of spring-elastic elements deforms to absorb kinetic energy of air particles in the volume flow, thereby causing the volume flow to decrease from the central opening to the outer ring.

2. Diaphragm according to claim 1, wherein the plurality of spring-elastic elements define a plurality of longitudinally shaped openings.

3. Diaphragm according to claim 1, wherein the plurality of spring-elastic elements are formed separately from one another.

4. Diaphragm according to claim 1 wherein the plurality of spring-elastic elements are arranged uniformly spaced apart from one another along the circumference of the diaphragm.

5. Diaphragm according to claim 1, wherein each spring-elastic element further includes an outer end that has a different width in the volume flow direction compared to the inner end.

6. Diaphragm according to claim 1, wherein the inner end of each spring-elastic element has in the volume flow direction a width that is greater than the width of an outer end.

7. Diaphragm according to claim 1, wherein the outer ring is an outer plastic ring.

8. Diaphragm according to claim 1, wherein each spring-elastic element has a tapered section forming longitudinally-shaped openings for volume flow between adjacent tapered sections of respective spring-elastic elements.

9. Diaphragm according to claim 1, wherein each spring-elastic element is configured as a bristle.

10. Diaphragm according to claim 1, wherein the plurality of spring-elastic elements are made from a plastic material.

11. Use of a diaphragm according to claim 1 for installation in an air distribution ducting system of an air-conditioning unit on board a commercial aircraft.

12. Diaphragm for throttling a volume flow in an air distribution ducting system of an air-conditioning unit of a commercial aircraft, comprising:
a plurality of spring-elastic elements effecting the throttling of the volume flow through the diaphragm, wherein the diaphragm is cylindrically shaped, the plurality of spring-elastic elements having inner ends that define a central opening and an axial width in the direction of the volume flow, the width being selected depending on the throttling and a reduction of noise to be obtained, the plurality of spring-elastic elements defining a permeable region that includes openings residing between the spring-elastic elements that extend radially outwardly, the permeable region attenuating a formation of turbulence bundles, wherein the plurality of spring-elastic elements deforms to absorb kinetic energy of air particles in the volume flow, thereby causing the volume flow to decrease from the central opening to the outer ring.

13. Diaphragm according to claim 12, wherein the inner ends of the plurality of spring-elastic elements comprise radially inner ends that define a circular opening.

14. Diaphragm according to claim 13, wherein the circular opening is arranged centrally on the axis of the diaphragm.

15. Diaphragm according to claim 12, wherein each spring-elastic element further includes an outer end that has a different width in the volume flow direction compared to the inner end.

16. Diaphragm according to claim 12, wherein the inner end of each spring-elastic element has in the volume flow direction a width that is greater than the width of an outer end.

17. Diaphragm according to claim 12, wherein each spring-elastic element has a tapered section forming longitudinally-shaped openings for volume flow between adjacent tapered sections of respective spring-elastic elements.

18. An apparatus comprising:
an aircraft;
an air conditioning unit located on the aircraft, the unit including an air distribution ducting system;
a diaphragm located in the air distribution ducting system, wherein the diaphragm is cylindrically shaped and includes a plurality of spring-elastic elements, the plurality of spring-elastic elements are framed in an outer ring, the plurality of spring-elastic elements defining a central opening and a permeable region that includes openings residing between the spring-elastic elements that extend radially outwardly, the permeable region attenuating a formation of turbulence bundles, thereby to effect the throttling of the volume flow through the air distribution ducting system,
wherein the plurality of spring-elastic elements reversibly deforms to absorb kinetic energy of air particles in the volume flow, thereby to cause the volume flow to decrease from the central opening to the outer ring, to reduce vibration of the diaphragm, and to reduce turbulent flow created by the throttling of the volume flow through the air distribution ducting system, wherein the reduced vibration and reduced turbulent flow results in lower noise levels in the air distribution ducting system.

19. The apparatus of claim 18, wherein the outer ring is an outer plastic ring, the spring-elastic elements including outer ends secured to the outer plastic ring and inner ends extending inwardly from the outer plastic ring.

20. The apparatus of claim 18, wherein the spring-elastic elements have an hourglass shape oriented in axial cross section.

* * * * *